Figure 1:
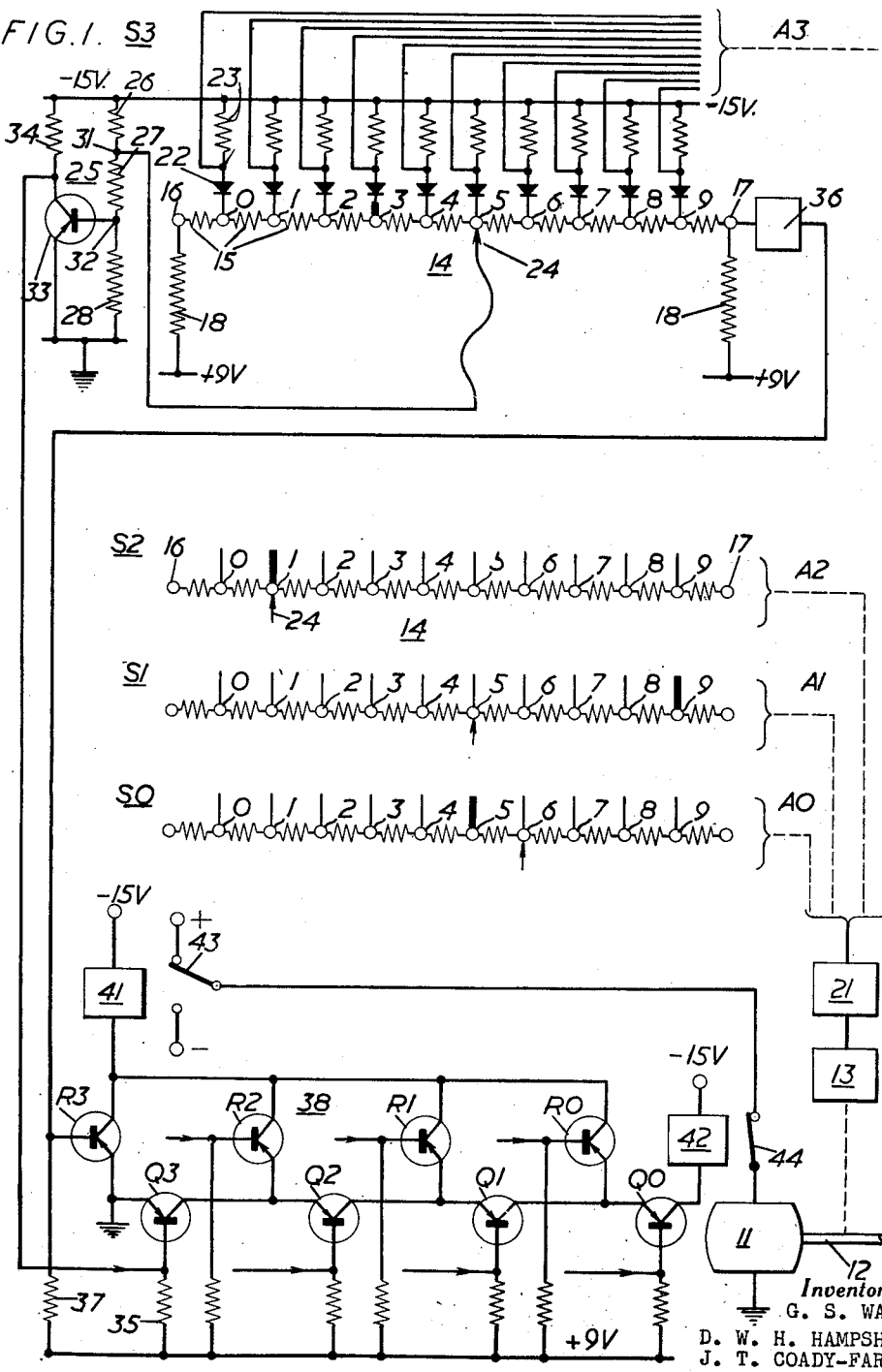

April 2, 1963   J. T. COADY-FARLEY ETAL   3,084,315
APPARATUS FOR POSITIONING A MOVABLE MEMBER
Filed Nov. 5, 1959   3 Sheets-Sheet 1

Inventors
G. S. WALKER
D. W. H. HAMPSHIRE
J. T. COADY-FARLEY
By Cameron, Kerkam & Sutton
Attorneys Inventors
G. S. WALKER
D. W. H. HAMPSHIRE
J. T. COADY-FARLEY
By Cameron, Kerkam & Sutton
Attorneys April 2, 1963   J. T. COADY-FARLEY ETAL   3,084,315
APPARATUS FOR POSITIONING A MOVABLE MEMBER
Filed Nov. 5, 1959   3 Sheets-Sheet 3
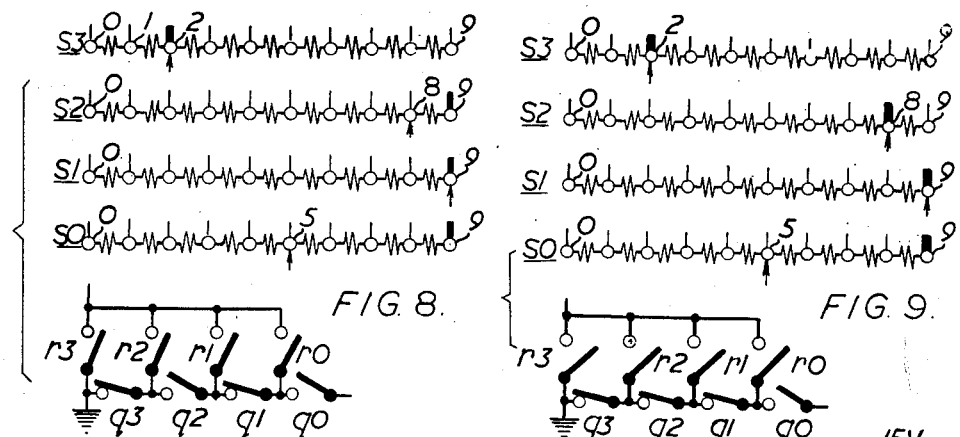
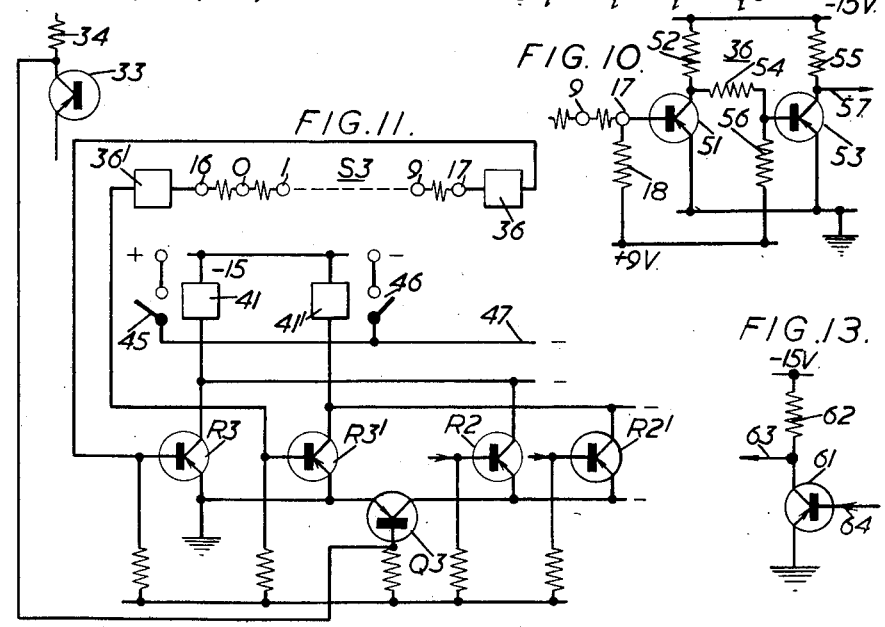
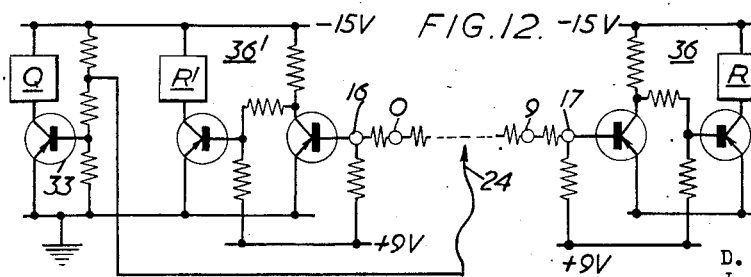
Inventors
G. S. WALKER
D. W. H. HAMPSHIRE
J. T. COADY-FARLEY
By Cameron, Kerkam & Sutton
Attorneys

United States Patent Office 3,084,315
Patented Apr. 2, 1963

3,084,315
APPARATUS FOR POSITIONING A
MOVABLE MEMBER
James Train Coady-Farley, Colinton, Edinburgh, and
David William Holmes Hampshire and George Sanderson Walker, Edinburgh, Scotland, assignors to Ferranti,
Limited, Hollinwood, Lancashire, England, a company
of the United Kingdom of Great Britain and Northern
Ireland
Filed Nov. 5, 1959, Ser. No. 851,050
Claims priority, application Canada June 18, 1959
9 Claims. (Cl. 318—28)

This invention relates to electronic counters and specifically to apparatus for pre-setting a number in a counter arranged to be operated by an actuator.

The invention has particular application to machine-tool control systems and will be described in that connection. It should however be understood that the invention is not restricted to such applications.

In certain machine-tool control systems it is known to employ a servo actuator which is arranged to adjust the position of an object such as a tool along a coordinate axis in response to some signal, such as a voltage, which energises the actuator. To indicate the position of the tool at any given moment there is provided an electronic counter of some kind which is also operated by the actuator and which accordingly indicates at any given moment by a number the point reached by the tool along the coordinate.

With such apparatus it is usually necessary to be able to preset the tool along the axis in an initial position from the origin. It is known to do this by means of a digital store in which is set the number representing the initial position of the tool. The servo system is then operated and as the actuator moves the tool from the origin along the axis towards the desired initial position the counter subtracts one digit from the store for each numerical position reached. This process continues until the store is empty, the tool being then in the required position with the number in the counter equal to the number originally preset in the store.

Such an arrangement depends for its operation on repetitive comparisons of the digit contents of store and counter, and apparatus hitherto disclosed for effecting this is somewhat complex and costly.

Where in such known apparatus it is necessary to preset the tool to a new desired position without first restoring it to the origin, it is necessary to enter in the store not the new value of the number but the difference, whether positive or negative, between the new value and the old.

An object of the present invention is to provide apparatus for the purpose stated of a more simple and less costly character and operating in a more direct manner than such apparatus as hitherto known.

Another object is to provide such apparatus in which a change in the value of the preset number may be effected without having to ascertain the difference between the new number and the previous number.

In the accompanying schematic diagrams,
FIGURE 1 shows one embodiment of the invention,
FIGURES 2 to 9 show portions of the diagram of FIGURE 1 during the operation of that embodiment,
FIGURE 10 shows in detail a portion of the apparatus shown generally in FIGURE 1,
FIGURES 11 and 12 each show a portion of FIGURE 1 modified in accordance with another embodiment, and
FIGURE 13 shows part of an electronic counter for use with apparatus in accordance with the invention.

In carrying out the invention in accordance with one form by way of a much simplified example, see FIG. 1, tool-control apparatus includes a servo actuator 11 arranged to drive a machine tool (not shown) along a coordinate axis by way of a shaft 12. The actuator is also coupled to an electronic counter 13 which operates on the binary system and indicates by its count at any given moment the number which represents the position of the tool along the axis at that moment.

Arrangements are made for pre-setting the tool along the axis and simultaneously pre-setting a corresponding number in the counter. Whereas it is usually more convenient for such a counter to operate on the binary system it is usually convenient from the point of view of persons operating the apparatus that any number preset in the apparatus in correspondence with a preset position of the tool should be in the decimal scale. For each required power of ten, therefore, there is provided a presettable selector. It is assumed that only four such powers are required and the corresponding selectors are designated S0 to S3 for the zero, first, second, and third powers of ten respectively.

Each selector includes a bank of ten fixed "digit" contacts representing the digit values 0 to 9 of the power and designated by those numerals in the figure. These contacts are connected to sequential taps along a tapped resistor 14 which may alternatively be considered as a potentiometer chain of equal resistors 15 with the digit contacts connected to their common points. The ends of the chain are connected from the zero and 9 digit taps to terminals 16 and 17, respectively, by way of a further resistor 15 in each case. Terminals 16 and 17 are connected through equal resistors 18 respectively to a source of +9 volts which thereby applies a positive bias potential to each end of resistor 14.

The binary output of counter 13 is applied to a binary/decimal converter 21 having four arrays A0 to A3 each of ten output leads, the arrays representing the zero, first, second, and third powers of ten respectively. The ten leads in each array are connected to the ten digit contacts 0 to 9, each to each, of the selector of the same power. Each connection is made by way of a diode 22 (see selector S3) the anode of which is connected to the lead of the array whilst the cathode is connected to the digit contact; each anode is also connected by way of a resistor 23 to a source of −15 volts.

The arrangement is such that whenever counter 13 holds a number in binary form, converter 21 holds that number in decimal form and represents it by applying ground potential to the one lead in each array which represents the decimal digit value (including zero, where appropriate) of the power concerned, the other leads being each maintained at a potential of −15 volts. The effect of this in each selector is that the digit contact connected to that one lead is at ground potential whereas all the other digit contacts are energised. For example, when converter 21 holds the number 7350, the 7, 3, 5, and 0 digit contacts of selectors S3 and S0 respectively are at ground potential, all the other digit contacts being at some other potential (to be indicated later). The ten digit contacts of each power are thus connected for distinctive energisation in accordance with the number in the counter, the appropriate contact being distinctive as regards its potential level—that is, because it is grounded whereas the other contacts are energised.

In each selector, adjustable contact means in the form of a wiper 24 is provided for engaging any selected one of the digit contacts 0 to 9. Also provided are means for biasing the wiper to a potential different from the potential of the distinctive contact. These take the form of a potentiometer 25—see selector S3—consisting of three resistors 26 and 28 connected in that order between the −15 volts source and ground. The wiper is connected to the common point 31 between resistors 26 and 27, resistor 26 having a small enough resistance for the wiper to have approximately the −15 volt potential except when engaging the distinctive contact. To the common point 32 of resistor 27 and 28 is connected the base electrode of a PNP transistor 33 the emitter of which is grounded and the collector of which is connected to the −15 volt source by way of a resistor 34.

The collector electrode of transistor 33 of selector S3 is also connected to a first switching device individual to that selector in the form of a PNP transistor Q3. The connection is applied to the base electrode of transistor Q3, this electrode being connected to the +9 volts source by way of a resistor 35. The remaining connections to this transistor will be described later.

To terminal 17 adjacent to the digit 9 end of resistor 14 of selector S3 is connected a second switching device, also individual to that selector, in the form of a PNP transistor R3. The connection is made to the base of the transistor by way of a two-stage transistor amplifier 36 to give a sufficiently amplified output of the correct sense. For an understanding of the basic principle of the invention, however, amplifier 36 may be disregarded and the connection from terminal 17 thought of as made direct to the base of transistor R3. The base of this transistor is connected to the +9 volts source by way of a resistor 37.

Each of selectors S2 and S0 is similar to selector S3. Each is provided with a first and a second switching device in the form of PNP transistors Q2, R2; Q1, R1; etc., as the case may be, individual to that selector, the base electrodes of which are connected by way of resistors to the +9 volt source. To clarify the drawing these three selectors are depicted in much simplified form, the connections between them and their respective Q and R switching devices being among the components omitted.

Each of transistors Q and R may be considered as a device for controlling a current path—that between the emitter and collector electrodes, as controlled by the potential of the base electrodes. All eight transistors are connected in a network 38 to control the energisation of an actuator-controlling device and reversing means in the form of a relay 41, and arresting means in the form of a relay 42.

The energising circuit of relay 41 is completed from the −15 volt source to ground by way of four parallel collector-emitter current paths including respectively those of transistors: (1) R3; (2) R2 and Q3 in series; (3) R1, Q2, and Q3 in series; and (4) R0 and Q1 to Q3 in series. Hence the parallel connection in respect of the paths controlled by the second switching device of a selector is completed by way of a series chain of the paths of the first switching devices of the selectors of higher power significance. This "series chain" is of course absent in the case of transistor R3 of the selector of highest significance and consists of only transistor Q3 in the case of transistor R2 of the next lower selector.

Relay 41 operates changeover or make-and-break contacts 43 which control the sense in which actuator 11 operates—i.e. the direction in which it moves the machine tool and actuates the counter 13. When the relay is energised, the make contacts cause a positive potential to be applied to the actuator, thereby causing it to operate in the direction for moving the tool forward along the axis whilst proportionately increasing the count in the counter. When the relay is unenergised, reversing means in the form of the break contacts and the spring which closes them cause the potential applied to the actuator to be negative, thereby causing it to move the tool back along the axis whilst proportionately decreasing the count.

The energising circuit of relay 42 is completed to ground by way of the emitter-collector paths of transistors Q3 to Q0 in series. This relay controls break contacts 44 in the energising circuit of the actuator so as to arrest the actuator when the relay is energised.

In describing the operation of the invention the terms concordant and discordant will for convenience be used with reference to the presettable selectors. These terms indicate respectively the two conditions of a selector in which the selected contact—that is, the contact engaged by the single wiper 24—is, and is not, the distinctive contact energised by converter 21. In other words, these two conditions are those in which a selector at any given moment respectively agrees with and disagrees with the number in the counter at that moment.

For brevity, a digit contact will be referred to as being "above" or "below" some other digit contact where the digit represented by the first-mentioned contact is of greater significance, or of less significance, as the case may be, than the digit represented by the other contact.

In the accompanying drawings, the one distinctive contact of each of arrays A3 to A0 is indicated by a thickening of the lead to it. In FIG. 1 the number in the counter is 3195 whereas the number preset is 5156; hence selector S2 is concordant and the other three selectors discordant.

The operation will now be described for the condition where the distinctive contact (indicated by a thickened lead) at earth potential is contact 3 whereas the selected contact (engaged by wiper 24) is contact 5, as depicted in the drawing for selector S3. Using the terminology defined above, the selector is thus discordant.

As the point 32 on potentiometer 25 is clearly negative, transistor 33 is conducting and so applying approximately earth potential to maintain transistor Q3 cut off with its current path broken, and with the control of relay 41 dependent solely on this selector so long as it is discordant.

Owing to its connection to point 31 near the high potential end of potentiometer 25, wiper 24 has a potential slightly less negative than −15 volts. Hence no point on resistor 14 is more negative than this and none of the diodes 22 is conducting except the diode in the lead to contact 3. The diodes thus serve to cut off from the counter all other contacts except the distinctive one. None of the −15 volt potentials on the leads to the digit contacts, therefore, has any effect on the potentials of the tappings of resistor 14, which is only influenced by the potentials applied to its ends from the +9 volt source and the intermediate potentials of ground and −15 volts at the distinctive and selected contacts respectively. Thus although they are cut off from the leads from converter 21, these other contacts are nevertheless energised by the local bias sources, leaving only contact 3 with its distinctive ground potential.

The effect of the negative bias on wiper 24 between the ground potential of contact 3 and the bias applied to terminal 17 is to render the potential of terminal 17 negative, the value of resistor 18 which connects this terminal to the +9 volt source being large enough compared with the values of the component resistors 15 of the chain to allow this. Transistor R3 is thereby energised, that is, its current path is completed.

If on the other hand wiper 24 was engaging some contact—contact 2, say—on the other side of distinctive contact 3, the ground potential at which contact 3 is held would shield the terminal 17 end of the chain from the wiper's negative potential. Consequently terminal 17 would be at some potential between ground and the +9 volt bias, with the result that transistor R3 would be cut off with its current path broken.

If wiper 24 was engaging the distinctive contact 3, the effect of the ground potential of that contact would be to drive tap 32 of potentiometer 25 sufficiently towards ground potential to cut off transistor 33 and so apply −15 volts to the base of transistor Q3 to render it conductive. Transistor R3 would be cut off, for the reason given in the preceding paragraph.

Thus only when wiper 24 is on a predetermined side of the distinctive contact—in this case above it—does the bias on the wiper cause the second switching device to complete its current path.

The positions of the wiper with respect to the distinctive contact are attended by similar operational results in each of the other selectors.

From a study of FIGURE 1 the following points will be readily appreciated, the selector references being to the particular example there depicted:

(a) Where a selector is concordant (selector S2) its Q transistor is conductive but its R transistor is cut off; consequently the current path controlled by its first switching device is completed whereas that controlled by its second switching device is broken.

(b) Where a selector is discordant its Q transistor is not energised and hence that current path is broken. Whether or not the R relay is energised depends on whether the selected contact is above the distinctive contact or below it. If the selected contact is above the distinctive contact (this being the above-mentioned predetermined side of the distinctive contact) the R transistor is energised, thereby completing the current path controlled by that second switching device (S3 and S0). If the selected contact is below the distinctive contact the R transistor is not energised (S1). The first-mentioned condition of discordance will for convenience be referred to as active discordance (because the R transistor is energised) and the other condition as passive discordance.

(c) Actuator 11 operates so long as any selector is discordant, whether actively or passively, for the Q transistor of that selector is then unenergised with its current path broken, and hence the arresting means constituted by relay 42 is unenergised with its break contacts 44 closed. When all the selectors are concordant the chain of energised Q transistors causes energisation of relay 42 to break the energising circuit of the actuator.

(d) Where a selector is discordant the direction in which the actuator drives the tool and the counter depends on whether the discordance is active or passive— assuming that its R transistor has control of relay 41 as described in more detail in the next paragraph; for if the discordance is active (S3 and S0) the energised R transistor is causing energisation of relay 41, which by make contacts 43 causes the actuator to move the tool forward and proportionately increase the count; whereas if the discordance is passive (S1) the unenergised R transistor causes relay 41 to be unenergised, and consequently the reversing means including break contacts 43 cause the actuator to operate in the other direction, thereby moving the tool back and decreasing the count.

(e) Where more than one selector is discordant, relay 41 is controlled by the R transistor of only the selector of highest power significance which is discordant, the R transistors of the discordant selectors of lower signficance being cut out of the energising circuit of relay 41 by the Q transistors of the discordant selector or selectors of higher significance. Hence the actuator operates first to bring the highest discordant selector into concordance; whereupon the resulting energisation of the Q transistor of that selector and the cutting off of its R transistor transfers the control of relay 41 to the discordant selector of next lower significance, and so on.

With the above points in mind, the following brief descriptions of the operation of the apparatus with the reference to FIGURES 2 to 9 should easily be understood. To clarify these diagrams, closed and open contacts *q*3, *r*3, etc. are used to represent transistors Q3, R3, etc., in their energised and cut off conditions respectively, and will be referred to as contacts. It should however be understood that in practice these contacts are really transistors.

In operation, suppose that the number in the counter is zero and it is desired to preset the machine tool to the coordinate position represented by the number 2891. Wipers 24 are accordingly adjusted to "select" digit contacts 2, 8, 9, and 1 of switches S3 to S0 respectively.

Figure 2:
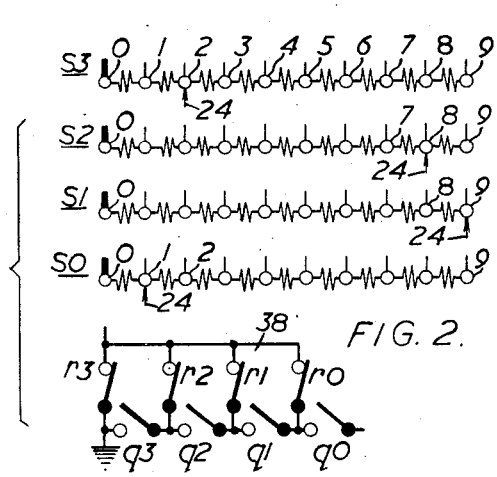

The condition of the apparatus is then as shown in FIGURE 2, with each 0 digit contact of selectors S3 to S0 rendered distinctive by being held at ground potential from converter 21.

As the selectors are discordant, relay 42 is unenergised and the actuator is operating. As contacts *q*3 are open the only *r* contacts in control of relay 21 are contacts *r*3 of selector S3; the conditions of the other *r* contacts are therefore irrelevant. In selector S3 the discordance is active; hence the contacts *r*3 are closed to energise the actuator in the direction for moving the tool forwards towards the desired position whilst recording a digit in the counter for each unit movement of the tool along the coordinate axis.

Figure 3:
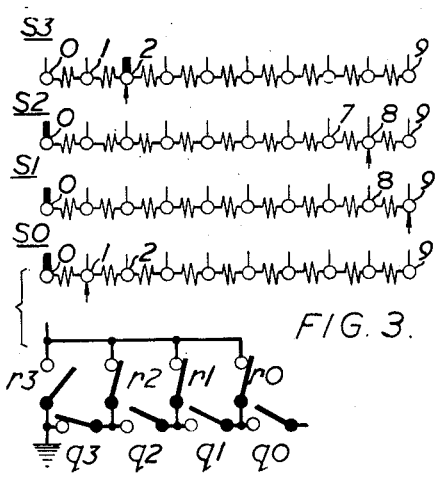
Figure 4:
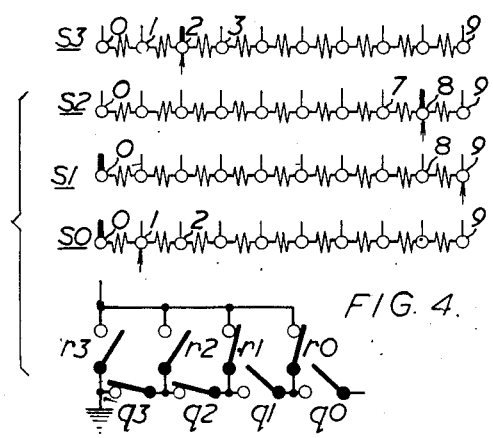

The actuator continues to operate until the decimal number derived in converter 21 from the binary number in counter 13 reaches the value 2000. In selector S3 the selected contact 2 is now the distinctive contact; in other words, selector S3 is now concordant. In consequence transistor R3 is cut off to open contacts *r*3, and transistor Q3 is energised to close contacts *q*3. The condition of the apparatus is now as shown in FIGURE 3.

The control of relay 41 has thus become transferred to the *r* contacts of the discordant selector of next lower significance, namely, selector S2, the *r* contacts of the lower selectors being still disconnected by contacts *q*2 and *q*1. As the discordance of this selector is also active, the actuator operates in the same sense as before until the number in the converter reaches the value 2800, whereupon contacts *r*2 open and *q*2 close to transfer the control to the next lower selector S1, see FIGURE 4. The operation continues until the number in the converter has the desired value 2891. When finally selector S0 becomes concordant all the *q* contacts are closed, thereby energising relay 42 to break contacts 44 and stop the actuator from further movement.

Figure 5:
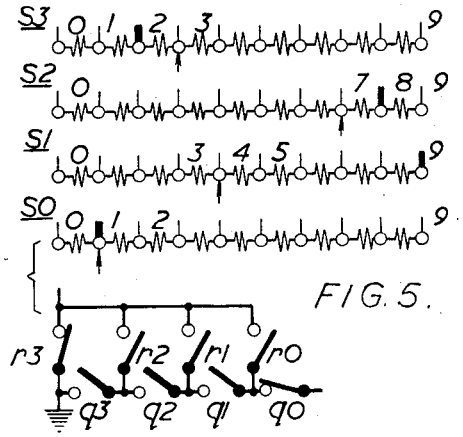
Figure 6:
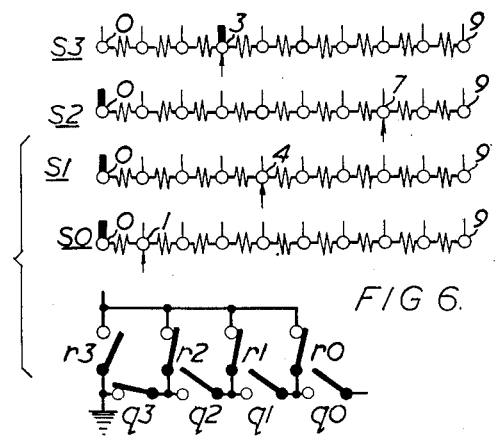

Suppose now that, having preset the tool as above described to the position represented by the number 2891, it is desired to alter the position to that represented by the number 3741. The wipers 24 are accordingly merely re-adjusted to the appropriate new positions, without the necessity for performing any subtraction process, whilst the distinctive digit contacts remain for the moment contacts 2, 8, 9, and 1, as before. The position is thus as shown in FIGURE 5. Selector S3 is actively discordant with contacts *q*3 broken to render irrelevant the contact conditions of the other three selectors. Transistor R3 is energised with contacts *r*3 closed. The actuator accordingly operates until the number in converter 21 reaches the value 3000, see FIGURE 6. The control then passes to selector S2, where the distinctive contact is no longer contact 8 but contact 0. As the selected contact, contact 7, is above this, discordance is active and the actuator again operates in the forward direction until the count reached 3700. The operation thus continues, in the manner first described, until the tool has reached the position represented by the new number 3741.

Figure 7:
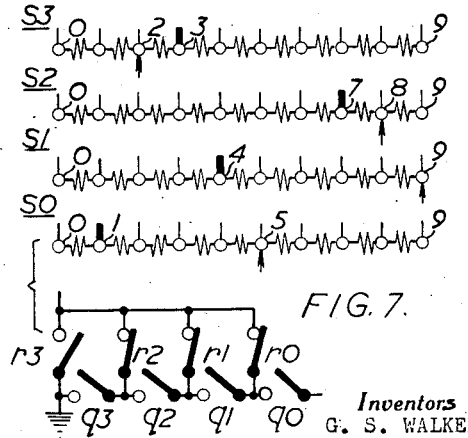

If now it is desired to adjust the present position of the tool in a backward direction, from, say, the position 3741 last reached to the position 2895, a subtraction process is again unnecessary, the operation being as follows from the moment when the wipers 24 have been adjusted to the appropriate digit contacts, see FIGURE 7.

Selector S3 is passively discordant, that is, with transistor R3 unenergised. The actuator thus operates in the direction for moving the tool back and decreasing the count until the position 2999 is reached, the control then passing to selector S2 (FIGURE 8). Here again the discordance is passive and the actuator again decreases the count until the value 2899 is reached (FIGURE 9). It will be observed that at this point not only are selectors S3 and S2 concordant but selector S1 is concordant also, since its selected contact is the distinctive contact 9. With contacts *q*3 to *q*1 thus closed and contacts *r*3 to *r*1 open, the control passes from selector S2 to selector S0, the discordance being again passive and the actuator continuing to operate in the direction for reducing the count until the tool has reached the position corresponding to the new number 2895 required.

Should the actuator overshoot when any selector reaches the concordant condition the Q transistor of that selector is cut off so that the R transistor regains control of the actuator. If just before the concordant condition was reached originally the R transistor was energised the overshoot will be to the condition where it is cut off; accordingly the actuator is now operated in the reverse of its previous direction and so regains the correct position. Similarly where the overshoot was from the condition where the R transistor was cut off: as the result of the overshoot it becomes energised, and the actuator is reversed as before.

Amplifier 36 of selector S3 may be as shown in FIGURE 10. The potential of terminal 17 is applied to the base electrode of a PNP transistor 51 the emitter of which is grounded and the collector connected to the −15 volt source by a load resistor 52 and to the base of another transistor 53 by a resistor 54. The emitter of transistor 53 is grounded, its collector is connected to the −15 volt source by a load resistor 55, and its base is connected to the +9 volt source by a resistor 56. The connection to the base of transistor R3 is taken from the collector of transistor 53 by way of a lead 57.

In operation, when wiper 24 is engaging the distinctive contact or a contact below it, terminal 17 is at a positive potential, with transistor 51 accordingly cut off. The resistance values of resistors 52, 54, and 56, which form in effect a potentiometer across the supply, are such that when transistor 51 is cut off, transistor 53 is energised, thereby applying approximately ground potential to lead 57 and so holding transistor R3 cut off. When on the other hand the selector is actively discordant—that is, when wiper 24 is engaging a contact above the distinctive one—the potential of terminal 17 is low enough for transistor 51 to be energised, which raises the potential of the base of transistor 53 to cut the latter off. A potential of about −15 volts is thus applied over lead 57 to the base of transistor R3 to close its current path.

As regards the values of the various resistors associated with the chain 14 of resistors 15, resistor 26 has to be sufficiently less than each of resistors 15 to enable wiper 24 to hold the selected contact (when other than the distinctive contact) at nearly −15 volts despite the positive potential applied by the +9 volt source to the ends 16 and 17 of the chain. As already stated, each resistor 18 is made sufficiently greater than each resistor 15 to allow either end of the chain to be driven negative by the negative potential of the wiper when the wiper is on that side of the distinctive contact. To enable the distinctive contact to be held at ground potential, each resistor 15 and resistor 26 must be greater than the impedance of the corresponding transistor (not shown) in the converter 21 which distinctively energises the digit contacts. Hence the values of these resistors depends to some extent on the internal impedances of the energising stage. Values that have been found suitable in practice in conjunction with an energising stage using standard type PNP transistors are as follows, indicating each resistor by its reference number in the drawings.

| Resistor: | Value in K ohms |
|---|---|
| 15 | 10 |
| 18 | 250 |
| 23 | 1 |
| 26 | 1 |
| 27 | 10 |
| 28 | 68 |
| 34 | 1 |

A typical arrangement at an energising stage will be described later with reference to FIGURE 13.

Owing to the high value of the resistance in its base electrode circuit transistor 51 should be of the high gain type. Where the R transistor has a high enough gain and relays 41 and 42 require only a small current to operate them the amplifier stage 36 may be dispensed with. Usually, however, the relays require too much energising current for this alternative to be practicable.

Various details of the above-described embodiment may be modified within the scope of the invention. For example, each R transistor may be controlled from the terminal 16 end of the chain 14 so that the predetermined side of the distinctive contact at which the wiper causes the R transistor to complete its current path is now the side below the distinctive contact rather than the side above it, as just described. In this alternative it is necessary to reverse the connections to contacts 43 so that the actuator operates to decrease the count when the controlling R transistor is energised.

Instead of being constituted by the break contacts of relay 41 and the spring which closes them when the relay is unenergised, the reversing means may be in the form of another transistor connected to terminal 16.

Such an arrangement is shown in FIGURE 11 as applied to selector S3 in which the additional transistor is indicated at $R3^1$ and shown as controlled from the terminal 16 end of the chain by way of a two-stage transistor amplifier $36^1$, which may be similar to amplifier 36 as described above with reference to FIGURE 10. Transistor $R3^1$ conducts only when wiper 24 is on the other side of the distinctive contact from the predetermined side—that is to say, only when the wiper is below the distinctive contact. Similar transistors $R2^1$, $R1^1$, etc., are added to each of the other selectors.

At network 38 each of the additional transistors $R3^1$, $R2^1$, etc., is connected in parallel with the corresponding transistor R3, R2, etc., of that selector, but between ground and a relay $41^1$. Relays 41 and $41^1$ respectively control make contacts 45 and 46 which when closed connected a source of positive or of negative potential, as the case may be, to actuator 11 by way of a connection 47 which leads to contacts 44.

The arrangement is accordingly such that when the highest discordant selector is actively discordant and in consequence the R transistor is conductive, relay 41 is energised to connect the actuator to the positive source as before, whereas when the discordance is passive and in consequence the $R^1$ transistor is conductive, relay $41^1$ is energised to connect the actuator to the negative source for operation in the reverse direction.

In any of the above embodiments components 41 and 42, and $41^1$ where provided, may be transistors instead of relays.

Switching devices R, Q, and $R^1$ may be in the form of relays rather than transistors, as shown in FIGURE 12. In this arrangement the load resistor 34 of transistor 33— see FIGURE 1—is in the form of relay Q and the load resistors 55 and $55^1$ of amplifiers 36 and $36^1$ are in the form of relays R and $R^1$ respectively. The relays control contacts $r3$, $q3$, etc., in network 38 as shown in any of FIGURES 2 to 9. Each of these contacts is a break contact—that is to say, when the relay is unenergised the contacts are closed and when the relay is energised the contacts are open. Consequently so long as wiper 24 is not engaging the distinctive contact, transistor 33 is conducting, to energise relay Q and hold its $q$ contacts open; as soon as wiper 24 engages the distinctive contact, transistor 33 is cut off, and its contacts $q$ close, thereby causing the current path controlled by this first switching device to be completed. Relays R and $R^1$ operate in a similar manner.

Where the counter 13 itself operates on the decimal system converter 21 may be dispensed with and the arrays A connected to the counter direct. In a particular kind of decimal counter each digit is represented by a transistor 61—see FIGURE 13—the emitter of which is grounded and the collector is connected to a −15 volts source by way of a load resistor 62. The collector is also connected to a lead 63 which acts as the lead for that digit in the appropriate one of the A arrays.

The stage is controlled by the potential on its base electrode, applied over a lead 64. When the particular digit represented by this stage is not the digit value of the power concerned, lead 64 is biased to cut transistor 61 off, thereby causing lead 63 and hence the corresponding digit contact at the selector to have the −15 volts potential. When on the other hand this digit is that of the power, lead 64 is biased to energise transistor 61, thereby causing lead 63 to have approximately ground potential and so render distinctive the corresponding digit contact.

It will be appreciated that the selectors can be used with other kinds of counter or converter, an intermediate stage being if necessary inserted to convert the particular kind of distinguishing energisation peculiar to the counter or converter to the kind required by the selectors.

It is not essential for the distinctive contact to be at ground potential so long as its potential level is sufficiently different from that of each of the other contacts of that selector for the apparatus to operate reliably.

Nor is it essential for the wiper to be biased negatively so long as it is biased to a different potential from that of the distinctive contact, the other biases and the transistor stages being modified to suit.

Where it is desired to operate the apparatus direct by electrical signals or by punched tape, the adjustable contact means instead of being in the form of a wiper, such as wiper 24, may instead take the form of a bank of contactors, one contactor being provided for each digit contact. The required contact is selected by causing the corresponding contactor to engage it. This may be effected in various ways which need not be particularised. Arrangements are made, as for wiper 24, whereby the contactor in use is connected to a source of bias, such as potentiometer 25, and to the first switching device of the selector concerned. The term "adjustable contact means" should accordingly be understood as including such a bank of contactors and its electrical equivalents.

Pre-setting apparatus in accordance with the invention is thus of an inexpensive and simple construction and moreover obviates the need for a subtraction process whenever the number already preset in the counter has to be altered.

What we claim is:

1. Apparatus for positioning a movable member comprising an actuator for moving the member, an electronic counter operably coupled to the actuator for indicating by the number in the counter at any given moment the position of the member at that moment, for each power of the radix of a predetermined numerical system to the limit required a presettable selector in the form of a tapped resistor, means for biasing the resistor by potentials of like sense at each end, for each digit of the power represented by the selector a digit contact connected for distinctive energisation in accordance with the number in the counter, the digit contacts of the selector forming the tapping points of said resistor, adjustable contact means for engaging any selected one of said contacts, arrangements for biasing said adjustable contact means to a different potential from that of the distinctive contact, that is to say, the contact distinctively energised as aforesaid, individual to each selector a first and a second switching device each for controlling a current path, means electrically connecting one end of the tapped resistor of each selector to the second switching device of that selector, the circuit constants being such that the bias on the adjustable contact means causes the second switching device to complete the current path controlled by it when and only when the selected contact is on a predetermined side of the distinctive contact, means electrically connecting the adjustable contact means of each selector to the first switching device of that selector, the circuit constants being such that when and only when the selector is concordant, that is to say, when the selected contact is the distinctive contact, the potential of the distinctive contact overcomes the bias of said adjustable contact means sufficiently to cause the first switching device to complete the current path controlled by it, an actuator-controlling device which when energised causes the actuator to move the member and operate the counter in one sense, that sense being in the direction to increase the number in the counter when the said predetermined side is above the distinctive contact, but to decrease said number when the predetermined side is below the distinctive contact, a network of said current paths in the energising circuit of the actuator-controlling device to allow that device to be controlled by the second switching device of only the selector of highest power significance which is not concordant, reversing means for causing the actuator to move the member and operate the counter in the opposite sense when the actuator-controlling device is not energised and at least one selector is not concordant, and arresting means for stopping the operation of the actuator when all the selectors are concordant.

2. Apparatus as claimed in claim 1 wherein each of said switching devices is a junction type transistor the emitter-collector path of which constitutes the said current path of the device, and said network includes the emitter-collector paths of the second switching devices connected electrically in parallel with one another in the energising circuit of the actuator-controlling device, each parallel connection in respect of a selector of other than the highest power significance being completed by way of a series chain of the emitter-collector paths of the first switching device of each selector of higher power significance.

3. Apparatus as claimed in claim 1 wherein said reversing means includes a pair of break contacts controlled by said actuator-controlling device and arranged to energise the actuator to move the member and operate the counter in the opposite sense to said one sense.

4. Apparatus as claimed in claim 1 wherein said reversing means includes in respect of each selector a third switching device for controlling a current path, arrangements for causing the third switching device to complete its current path when the selected contact is on the other side of the distinctive contact from said predetermined side, a second actuator-controlling device which when energised causes the actuator to move the member and operate the counter in the opposite sense to said one sense, the current paths of said third switching devices being connected electrically in parallel with one another in the energising circuit of the second actuator-controlling device, each parallel connection in respect of a selector of other than the highest power significance being completed by way of a series chain of the emitter-collector paths of the first switching device of each selector of higher power significance.

5. Apparatus as claimed in claim 4 wherein the third switching device of each selector is connected to the other end of said tapped resistor from the second switching device.

6. Apparatus as claimed in claim 5 wherein said third switching device is a junction type transistor the emitter-collector path of which constitutes the said current path of the device.

7. Apparatus as claimed in claim 1 wherein each of said first and second switching devices is a relay which controls contacts constituting the said current path of the device, and said network includes the said contacts of the second switching devices connected electrically in parallel with one another in the energizing circuit of the actuator-controlling device, each parallel connection in respect of a selector of other than the highest power significance being completed by way of a series chain of the said contacts of the first switching device of each selector of higher power significance.

8. Apparatus as claimed in claim 5 wherein said third switching device is a relay which controls contacts constituting the said current path of the device.

9. Apparatus as claimed in claim 1 wherein said arresting means includes an On/Off device arranged when energized to break the energizing circuit of the actuator, there being included in the energising circuit of this On/Off device the current paths of all the first switching devices in series.

References Cited in the file of this patent

UNITED STATES PATENTS

| | | |
|---|---|---|
| 2,721,967 | Olin | Oct. 25, 1955 |
| 2,755,425 | Reid | July 17, 1956 |
| 2,814,013 | Schweighofer | Nov. 19, 1957 |
| 2,823,344 | Ragland | Feb. 11, 1958 |
| 2,846,634 | Bauer et al. | Aug. 5, 1958 |
| 2,853,664 | Towns et al. | Sept. 23, 1958 |
| 2,885,613 | Myracle et al. | May 5, 1959 |
| 2,930,030 | Hirose | Mar. 22, 1960 |
| 2,969,490 | Anderson et al. | Jan. 24, 1961 |